United States Patent [19]
Shimada et al.

[11] Patent Number: 6,128,060
[45] Date of Patent: Oct. 3, 2000

[54] LIQUID CRYSTAL DISPLAY DEVICE HAVING OPENINGS FORMED IN INTERLAYER INSULATING LAYER

[75] Inventors: Yoshinori Shimada, Taki-gun; Takayuki Shimada, Yamatokoriyama; Mikio Katayama, Ikoma, all of Japan

[73] Assignee: Sharp Kabushiki Kaisha, Osaka, Japan

[21] Appl. No.: 09/084,095

[22] Filed: May 26, 1998

[30] Foreign Application Priority Data

May 27, 1997 [JP] Japan ..................................... 9-137294

[51] Int. Cl.⁷ .................................................. G02F 1/1333
[52] U.S. Cl. ............................................................ 349/138
[58] Field of Search ................................... 349/138, 110, 349/46, 42; 257/72

[56] References Cited

U.S. PATENT DOCUMENTS

| | | | |
|---|---|---|---|
| 4,470,060 | 9/1984 | Yamazaki ................................... | 349/46 |
| 5,032,883 | 7/1991 | Wakai et al. ............................... | 349/42 |
| 5,042,918 | 8/1991 | Suzuki ....................................... | 349/42 |
| 5,585,951 | 12/1996 | Noda et al. . | |
| 5,641,974 | 6/1997 | den Boer et al. . | |
| 5,751,020 | 5/1998 | Lyu ........................................... | 257/72 |

*Primary Examiner*—William L. Sikes
*Assistant Examiner*—Toan Ton
*Attorney, Agent, or Firm*—Nixon & Vanderhye P.C.

[57] ABSTRACT

A liquid crystal display device includes a first plate and a second plate; a liquid crystal layer interposed between the first plate and the second plate; a switching element provided between the first plate and the liquid crystal layer; an interlayer insulating layer provided between the first plate and the liquid crystal layer; a pixel electrode provided on the interlayer insulating layer; a counter electrode provided between the second plate and the liquid crystal layer; and a gate signal line and a source signal line both connected to the switching element. The interlayer insulating layer has a first opening and a second opening. The pixel electrode is electrically connected to the switching element through the first opening. The second opening is positioned above the switching element.

31 Claims, 8 Drawing Sheets

LIQUID CRYSTAL DISPLAY DEVICE HAVING OPENINGS FORMED IN INTERLAYER INSULATING LAYER

BACKGROUND OF THE INVENTION

1. Field of the Invention

The present invention relates to a display device using, for example, a liquid crystal material; and in particular, a liquid crystal display device having a sufficiently small deviation among threshold characteristics of thin film transistors which are respectively provided with respect to a plurality of pixel electrodes.

2. Description of the Related Art

A liquid crystal display device using a thin film transistor (hereinafter, referred to as a "TFT") as a switching element will be described with reference to FIG. 6.

Figure 6:
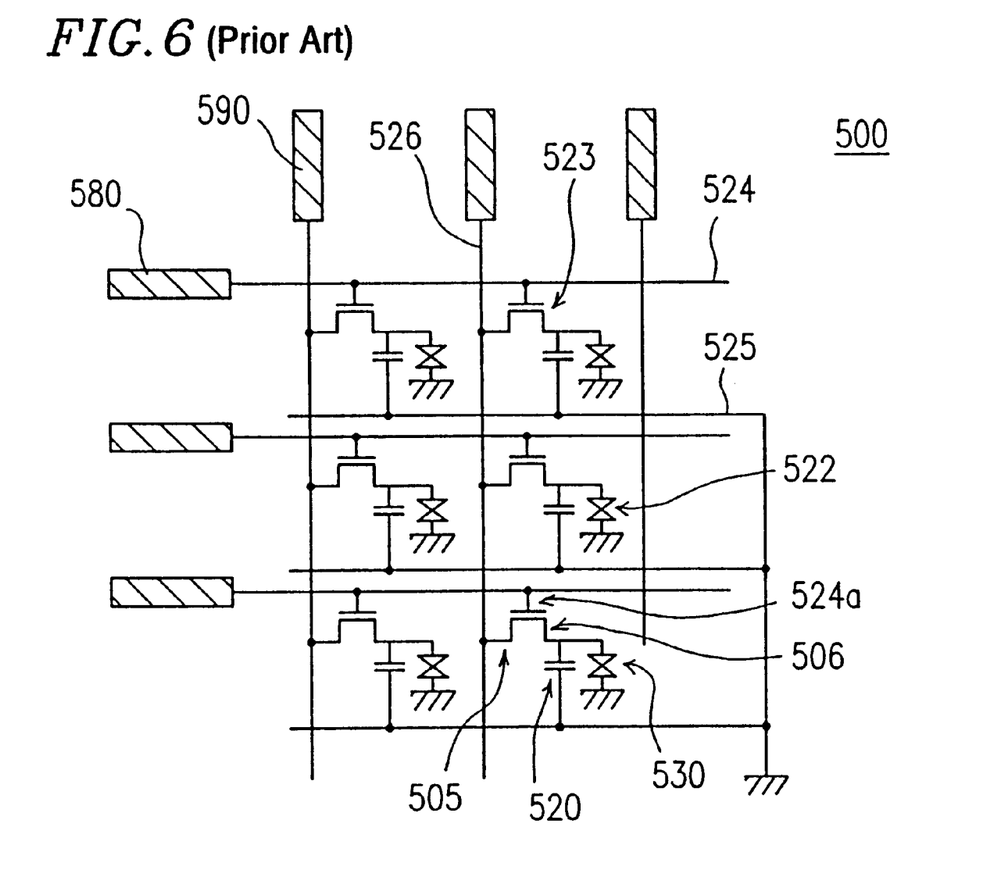
FIG. 6 is a general schematic view of a liquid crystal display device.

As shown in FIG. 6, a liquid crystal display device 500 includes a plurality of TFTs 523, pixel capacitors 522, gate signal lines 524, source signal lines 526, storage capacitor lines 525, and driving circuits 580 and 590. The TFTs 523 and the pixel capacitors 522 are both provided in a matrix, i.e., in rows and columns. The pixel capacitors 522 each include a storage capacitor 520 and the liquid crystal capacitor 530.

The plurality of gate signal lines 524 extends in a first direction (i.e., row direction), and the plurality of source signal lines 526 extends in a second direction (i.e., column direction) perpendicular to the first direction. Each of gate signal lines 524 is connected to gate electrodes 524a of the TFTs 523 arranged in the corresponding row. Each of source signal lines 526 is connected to source electrodes 505 of the TFTs 523 arranged in the corresponding column.

For simplicity, the following description will be given regarding one pixel area.

A drain electrode 506 of the TFT 523 is connected to a pixel electrode, which is one of electrodes of the liquid crystal capacitor 530, and also connected to one of two electrodes of the storage capacitor 520. The other electrode of the storage capacitor 520 is connected to the storage capacitor line 525 and further to a counter electrode provided on a counter substrate (not shown).

The gate signal line 524 is supplied with a scanning signal by the driving circuit 580, and the source signal line 526 is supplied with a video signal by the driving circuit 590. The TFT 523 supplies the pixel capacitor 522 with a video signal sent from the source signal line 526 in accordance with the scanning signal supplied by the gate signal line 524.

Figure 7A:
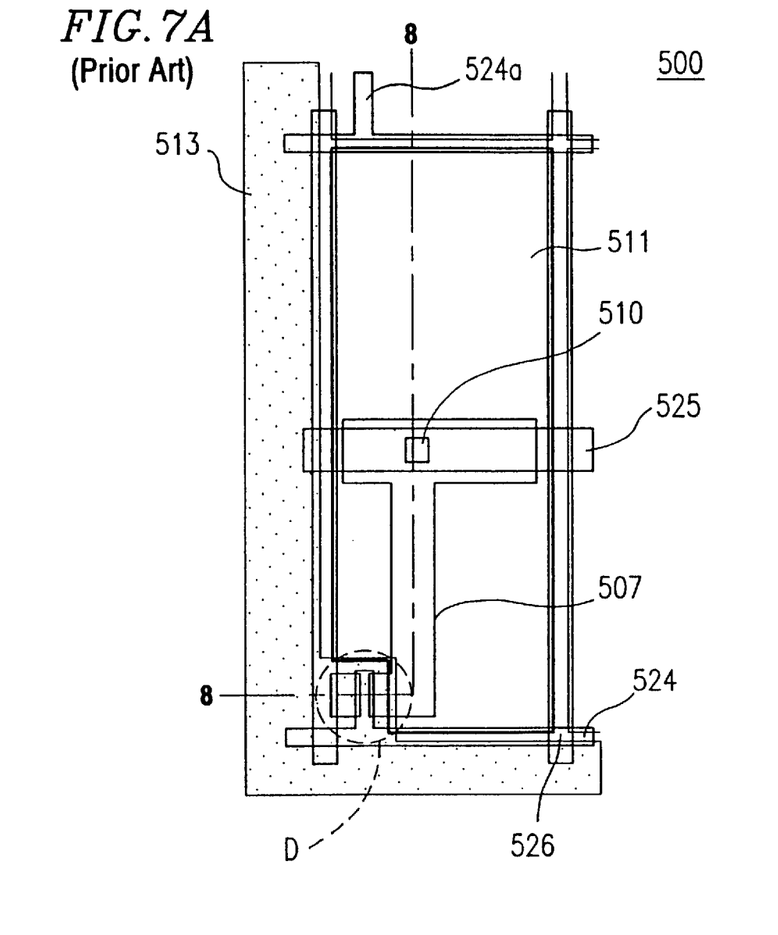
FIG. 7A is a plan view of one pixel area of a conventional liquid crystal display device.
Figure 7B:
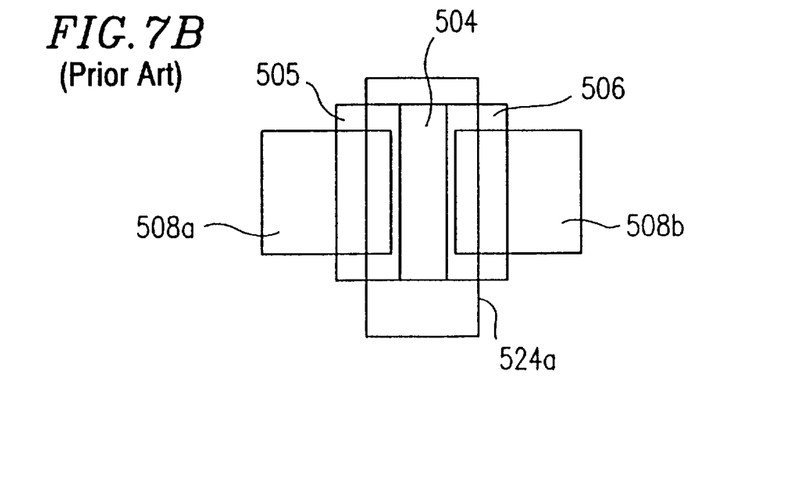
FIG. 7B is an enlarged view of part D of the liquid crystal display device shown in FIG. 7A.
Figure 8:
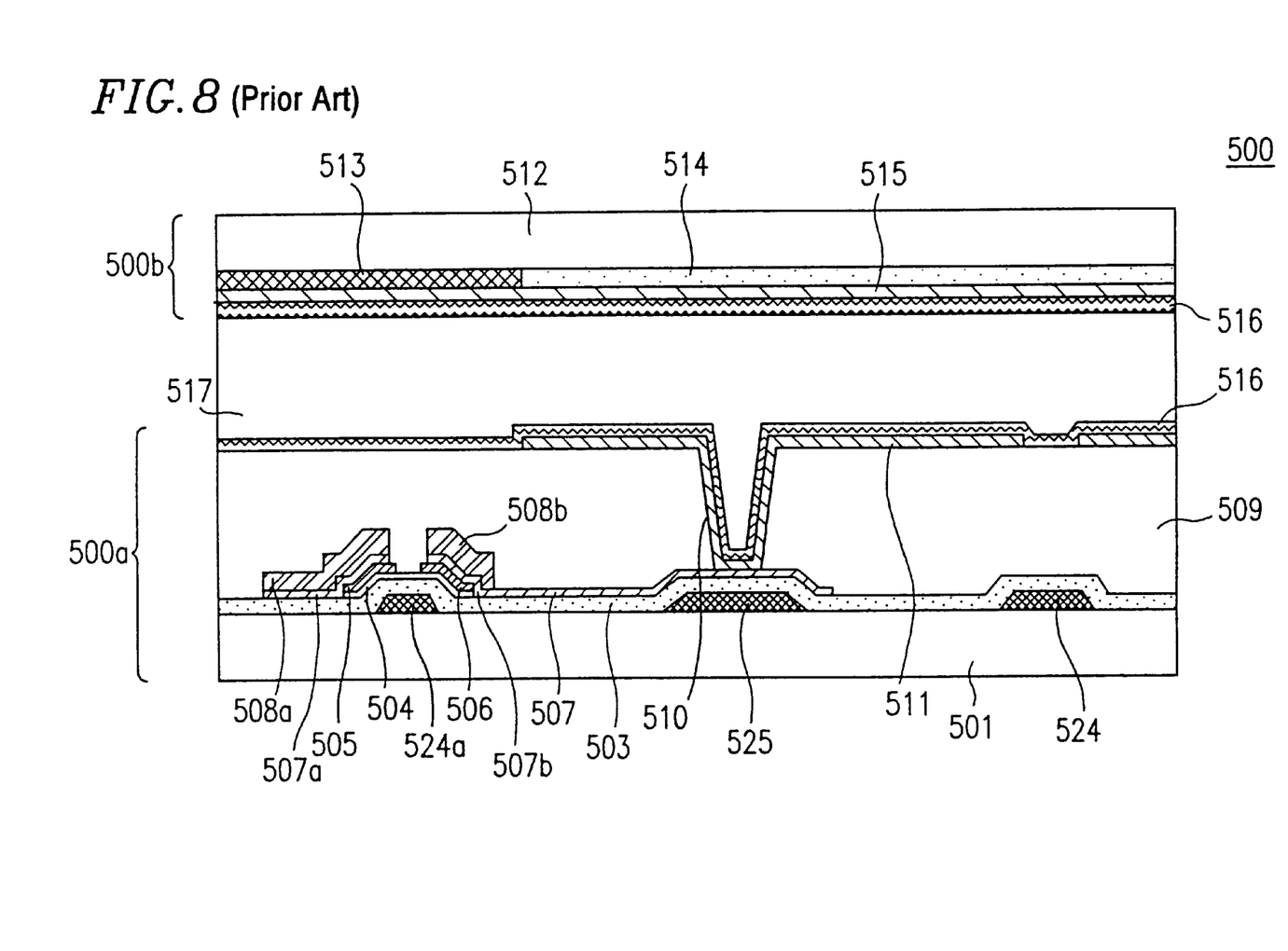
FIG. 8 is a cross-sectional view of the conventional liquid crystal display device shown in FIG. 7A taken along line 8—8 in FIG. 7A.

With reference to FIGS. 7A, 7B and 8, a pixel area in the liquid crystal display device 500 will be described in detail.

FIG. 7A is a view illustrating a planar structure of one pixel area of the liquid crystal display device 500, and FIG. 7B is an enlarged view of part D in FIG. 7A. FIG. 8 is a cross-sectional view of the one pixel area of the liquid crystal display device 500 shown in FIG. 7A taken along line 8—8 in FIG. 7A.

As shown in FIG. 8, the liquid crystal display device 500 includes an active matrix substrate 500a, a counter substrate 500b, and a liquid crystal layer 517 interposed therebetween.

The active matrix substrate 500a includes a light-transmissive insulative plate 501. The gate signal line 524, a gate electrode 524a branched from the gate signal line 524, and a storage capacitor line 525 are provided on the insulative plate 501. A gate insulating layer 503 is provided on the insulative plate 501 so as to cover the gate signal line 524, the gate electrode 524a, and the storage capacitor line 525.

A semiconductor layer 504 is provided on the gate insulating layer 503 so as to overlap the gate electrode 524a. The source electrode 505 and the drain electrode 506, each formed of an $n^+$-Si layer, are provided on the semiconductor layer 504. The source electrode 505 and the drain electrode 506 have a gap therebetween on the semiconductor layer 504. The TFT 523 includes the gate electrode 524a, the semiconductor layer 504, the source electrode 505 and the drain electrode 506.

An ITO layer 507a and a metal layer 508a are provided sequentially in this order on the source electrode 505. The ITO layer 507a and the metal layer 508a act together as a source leading electrode. The ITO layer 507a and the metal layer 508a extend on the gate insulating layer 503 in a direction perpendicular to the gate signal line 524, so as to act as the source signal line 526.

An ITO layer 507b and a metal layer 508b are provided sequentially in this order on the drain electrode 506. The ITO layer 507b and the metal layer 508b act together as a drain leading electrode. The ITO layer 507b extends to an area below a through-hole 510 (described below), so as to act as a leading electrode 507.

An interlayer insulating layer 509 is provided on the gate insulating layer 503 so as to cover the TFT 523, the source signal line 526 and the leading electrode 507. A pixel electrode 511 formed of a transparent conductive layer is provided on the interlayer insulating layer 509. An alignment layer 516 is provided on the interlayer insulating layer 509 so as to cover the pixel electrode 511.

The interlayer insulating layer 509 has a through-hole 510 formed therethrough. The pixel electrode 511 is electrically connected to the leading electrode 507 through the through-hole 510. Due to such a structure, the pixel electrode 511 and the drain electrode 506 of the TFT 523 are electrically connected to each other.

The position of the through-hole 510 corresponds to the storage capacitor line 525 provided on the insulative plate 501. A portion where the storage capacitor line 525, the gate insulating layer 503 and the leading electrode 507 overlap one another acts as the storage capacitor 520.

The counter substrate 500b includes a light-transmissive insulative plate 512. A color filter 514 and a light blocking layer 513 are provided on the insulative plate 512. A counter electrode 515 is provided on the color filter 514 and the light blocking layer 513. An alignment layer 516 is provided on the counter electrode 515.

In the above-described structure, the interlayer insulating layer 509 is provided between the gate signal line 524/source signal line 526 and the pixel electrode 511. Accordingly, the pixel electrode 511 can overlap the gate signal line 524 and the source signal line 526. Such a structure is disclosed in, for example, Japanese Laid-Open Publication No. 58-172685. It is known that such a structure has an effect of improving the aperture ratio. It is also known that this structure has an effect that the pixel electrode blocks the electric field caused by the gate signal line and the source signal line, thereby suppressing defective alignment of liquid crystal molecules.

In order to realize the above-described structure in which the pixel electrode overlaps the gate electrode and the source electrode, it is necessary to reduce the parasitic capacitance generated between the gate electrode/source electrode and the pixel electrode.

The parasitic capacitance has a serious adverse influence referred to as "shadowing" on the display quality in an active matrix liquid crystal display device. Shadowing can be reduced by adopting a certain driving method, but it is preferable to reduce the parasitic capacitance itself in order to solve the problem substantively.

As a solution of such a problem, the interlayer insulating layer is formed of, for example, acrylic resins, polyimide, benzocyclobutene, and fluorocarbon resins. These materials realize formation of an insulating layer having a low dielectric constant (specific dielectric constant of equal to or less than that of a silicon oxide layer) and a thickness of about 2 to 5 $\mu$m. However, such an insulating layer contains metal ions as impurities in the order of several hundred parts per billion. The metal impurities cause deviation in the threshold voltage among the TFTs and thus increase the deviation in the characteristics of the resultant liquid crystal display devices.

SUMMARY OF THE INVENTION

According to one aspect of the invention, a liquid crystal display device includes a first plate and a second plate; a liquid crystal layer interposed between the first plate and the second plate; a switching element provided between the first plate and the liquid crystal layer; an interlayer insulating layer provided between the first plate and the liquid crystal layer; a pixel electrode provided on the interlayer insulating layer; a counter electrode provided between the second plate and the liquid crystal layer; and a gate signal line and a source signal line both connected to the switching element. The interlayer insulating layer has a first opening and a second opening. The pixel electrode is electrically connected to the switching element through the first opening. The second opening is positioned above the switching element.

In one embodiment of the invention, the liquid crystal display device further includes a first light blocking member covering the first opening for shielding the first opening against light; and a second light blocking member covering the second opening for shielding the second opening against light.

In one embodiment of the invention, the switching element is a thin film transistor.

In one embodiment of the invention, the thin film transistor comprises a gate electrode electrically connected to the gate signal line; a source electrode electrically connected to the source signal line; a drain electrode electrically connected to the pixel electrode; and a channel region for electrically connecting the source electrode and the drain electrode when the gate electrode is supplied with a voltage. The second opening is positioned above the channel region.

In one embodiment of the invention, the liquid crystal display device further includes a first light blocking member covering the first opening for shielding the first opening against light; and a second light blocking member covering the second opening for shielding the second opening against light.

In one embodiment of the invention, the second light blocking member is a gate electrode.

In one embodiment of the invention, the second light blocking member is provided between the second plate and the liquid crystal layer.

In one embodiment of the invention, the second light blocking member is provided between the first plate and the thin film transistor, and the thin film transistor is provided above the second light blocking member with an insulating layer interposed therebetween.

In one embodiment of the invention, the interlayer insulating layer includes a photosensitive organic insulating layer.

In one embodiment of the invention, the gate signal line and the source signal line are overlapped above a peripheral area of the pixel electrode with the interlayer insulating layer interposed therebetween.

According to another aspect of the invention, the interlayer insulating layer of the liquid crystal display device has an opening. The pixel electrode is electrically connected to the switching element through the opening. The opening is in positioned above the switching element.

In one embodiment of the invention, the liquid crystal display device further includes a light blocking member covering the opening for shielding the opening against light.

In one embodiment of the invention, the switching element is a thin film transistor.

In one embodiment of the invention, the thin film transistor comprises a gate electrode electrically connected to the gate signal line; a source electrode electrically connected to the source signal line; a drain electrode electrically connected to the pixel electrode; and a channel region for electrically connecting the source electrode and the drain electrode when the gate electrode is supplied with a voltage. The opening is positioned above the channel region and the drain electrode.

In one embodiment of the invention, the liquid crystal display device further includes a light blocking member covering the opening for shielding the opening against light.

In one embodiment of the invention, the light blocking member is a gate electrode.

In one embodiment of the invention, the light blocking member is provided between the second plate and the liquid crystal layer.

In one embodiment of the invention, the light blocking member is provided between the first plate and the thin film transistor, and the thin film transistor is provided above the light blocking member with an insulating layer interposed therebetween.

In one embodiment of the invention, the interlayer insulating layer includes a photosensitive organic insulating layer.

In one embodiment of the invention, the gate signal line and the source signal line are overlapped above a peripheral area of the pixel electrode with the interlayer insulating layer interposed therebetween.

According to the present invention, the interlayer insulating layer is not provided on the switching element. Therefore, the adverse influence exerted on the switching element by the metal ions contained in the interlayer insulating layer is eliminated. Thus, the deviation in the threshold voltage among the switching elements is reduced.

The interlayer insulating layer has slanting surfaces after the opening is formed above the switching element, and the slanting surfaces cause generation of domains of liquid crystal molecules in the liquid crystal layer, in an area corresponding to the vicinity of the opening. Since a light blocking member is provided for shielding the vicinity of the opening according to the present invention, the adverse influence exerted on the display quality by the slanting surfaces is prevented.

Thus, the invention described herein makes possible the advantage of providing a liquid crystal display device having a reduced deviation in the threshold voltage among TFTs and thus having a satisfactory display quality.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1A:
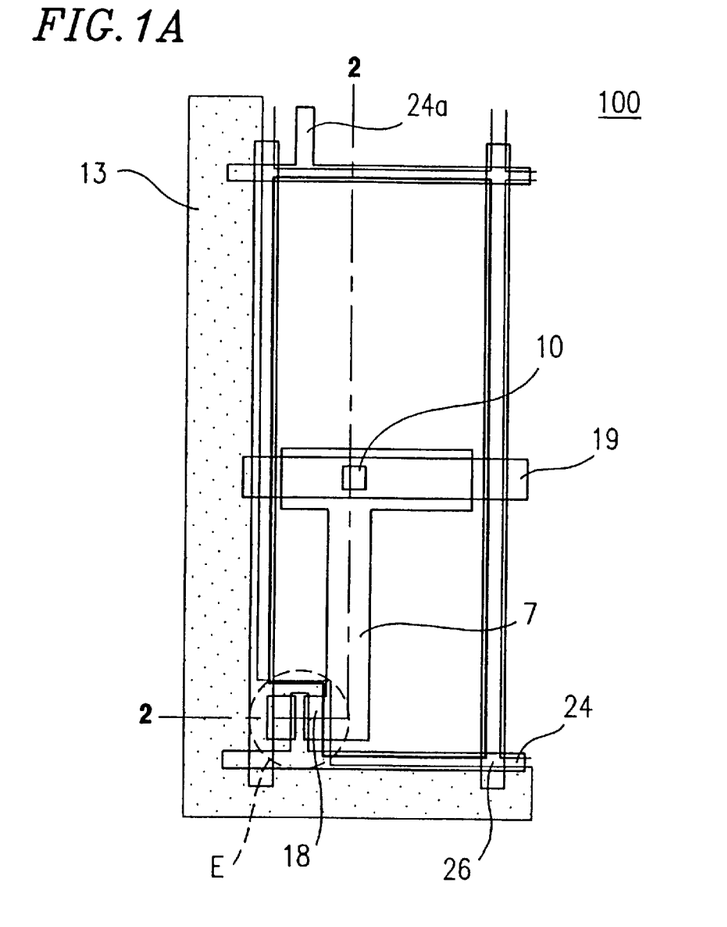
FIG. 1A is a plan view of one pixel area of a liquid crystal display device in a first example according to the present invention.
Figure 1B:
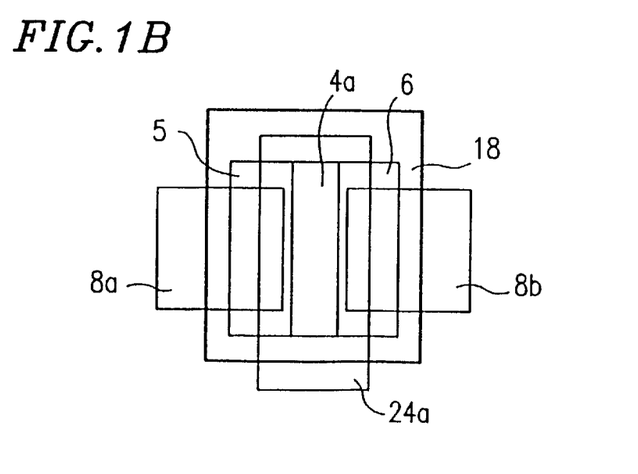
FIG. 1B is a view illustrating the planar positional relationship between a second opening and a TFT of the liquid crystal display device shown in FIG. 1A.
Figure 2:
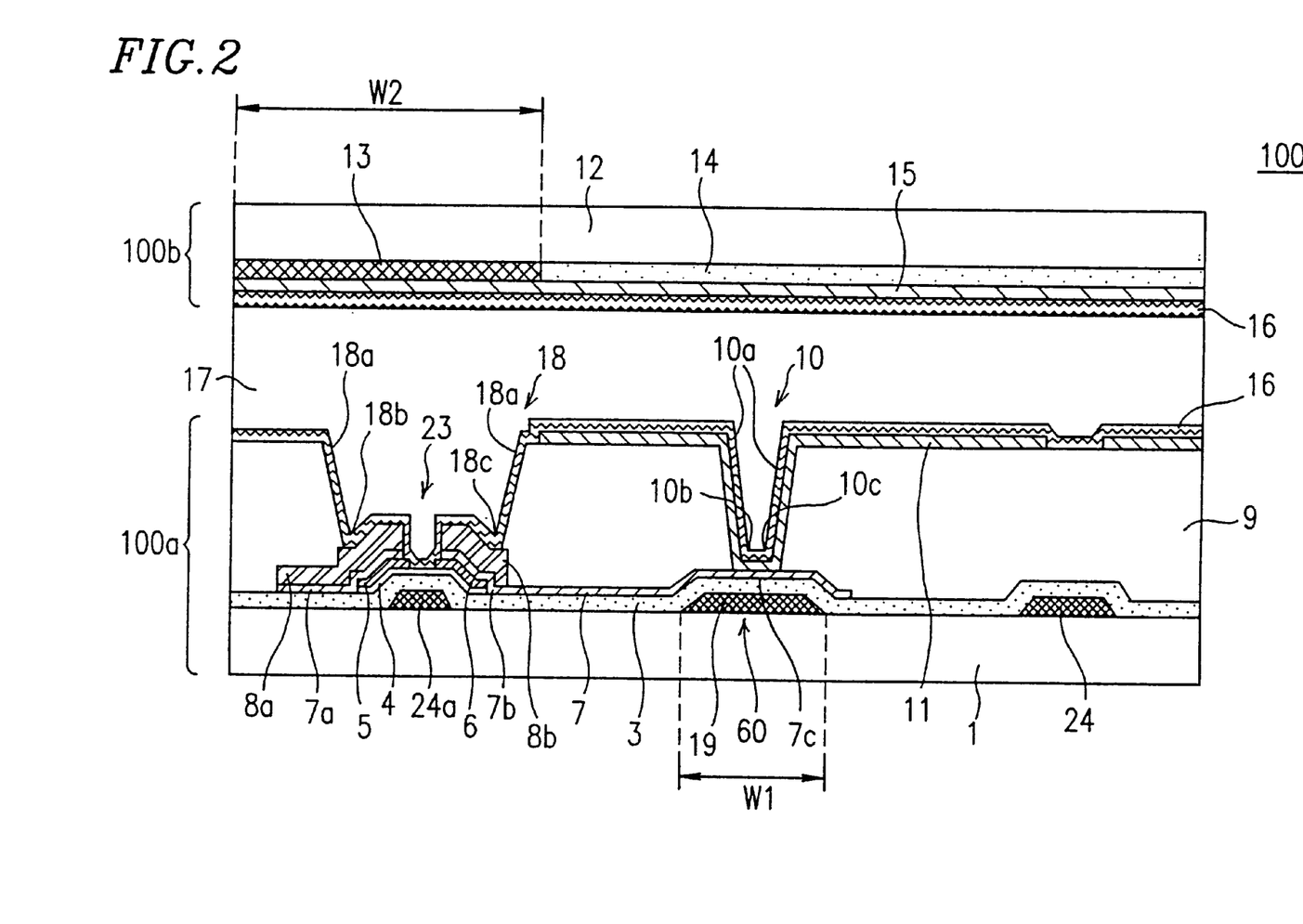
FIG. 2 is a cross-sectional view of the liquid crystal display device shown in FIG. 1A taken along line 2—2 in FIG. 1A.

A liquid crystal display device 100 in a first example according to the present invention will be described. FIG. 1A is a plan view of one pixel area of the liquid crystal display device 100, and FIG. 1B is an enlarged view of part E of the liquid crystal display device 100 shown in FIG. 1A. FIG. 2 is a cross-sectional view of the one pixel area taken along line 2—2 in FIG. 1A. Again, for simplicity, the following description will be given regarding one pixel area.

As shown in FIG. 2, the liquid crystal display device 100 includes an active matrix substrate 100a, a counter substrate 100b, and a liquid crystal layer 17 interposed therebetween.

The active matrix substrate 100a includes an insulative plate 1 (first plate) which is transmissive with respect to visible light. A gate signal line 24, a gate electrode 24a branched from the gate signal line 24, and a storage capacitor line 19 are provided on the insulative plate 1. A gate insulating layer 3 is provided on the insulative plate 1 so as to cover the gate signal line 24, the gate electrode 24a, and the storage capacitor line 19. The storage capacitor line 19 is positioned to correspond to a first opening 10 (described below) with the gate insulating layer 3 interposed therebetween. Width W1 of the storage capacitor line 19 is set so that the storage capacitor line 19 is extended beyond a bottom edge 10b of the first opening 10 by, for example, about 5 μm in the width direction and also beyond a bottom edge 10c of the first opening 10 by, for example, about 5 μm in the width direction.

A semiconductor layer 4 is provided on the gate insulating layer 3 so as to overlap the gate electrode 24a. A source electrode 5 and a drain electrode 6, each formed of an n$^+$-Si layer, are provided on the semiconductor layer 4. The source electrode 5 and the drain electrode 6 have a gap therebetween on the semiconductor layer 4. Thus, the semiconductor layer 4 has a channel region 4a (FIG. 1B) therein. The channel region 4a electrically connects the source electrode 5 and the drain electrode 6 when the gate electrode 24a is supplied with a voltage. A TFT 23 includes the gate electrode 24a, the semiconductor layer 4, the source electrode 5 and the drain electrode 6.

An ITO layer 7a and a metal layer 8a are provided sequentially in this order on the source electrode 5. The ITO layer 7a and the metal layer 8a act together as a source leading electrode. The ITO layer 7a and the metal layer 8a extend on the gate insulating layer 3 in a direction perpendicular to the gate signal line 24, so as to act as a source signal line 26 (FIG. 1A).

An ITO layer 7b and a metal layer 8b are provided sequentially in this order on the drain electrode 6. The ITO layer 7b and the metal layer 8b act together as a drain leading electrode. The ITO layer 7b extends to an area below the opening 10, so as to act as a leading electrode 7 for electrically connecting a pixel electrode 11 (described below) and the drain electrode 6.

An interlayer insulating layer 9 is provided on the gate insulating layer 3 so as to cover the source signal line 26 and the leading electrode 7. The pixel electrode 11 formed of a transparent conductive layer is provided on the interlayer insulating layer 9. An alignment layer 16 is provided on the interlayer insulating layer 9 so as to cover the pixel electrode 11. As shown in FIG. 1A, a peripheral area of each of the gate signal line 24 and the source signal line 26 overlaps a peripheral area of the pixel electrode 11 with the interlayer insulating layer 9 interposed therebetween.

Returning to FIG. 2, the interlayer insulating layer 9 has the first opening 10 and a second opening 18. As described above, the first opening 10 is positioned in correspondence with a part of the storage capacitor line 19. The second opening 18 is positioned in correspondence with the TFT 23.

The first opening 10 acts as a through-hole for electrically connecting the pixel electrode 11 and the leading electrode 7. Therefore, the pixel electrode 11 and the drain electrode 6 of the TFT 23 are electrically connected to each other. An end portion 7c of the leading electrode 7 overlaps the storage capacitor line 19 with the gate insulating layer 3 interposed therebetween. Thus, a portion where the storage capacitor line 19, the gate insulating layer 3 and the leading electrode 7 overlap one another acts as the storage capacitor 60.

FIG. 1B is an enlarged view of part E in FIG. 1A and shows the planar positional relationship between the second opening 18 and the TFT 23. The planar cross-section of the second opening 18 accommodates the source electrode 5, the drain electrode 6, and the channel region 4a of the TFT 23.

The second opening 18 formed above the TFT 23 eliminates the interlayer insulating layer 9 above the TFT 23, and thus eliminates the adverse influence exerted on the TFT 23 by the metal ions contained in the interlayer insulating layer 9. Accordingly, the deviation in the threshold voltage among a plurality of TFTs 23 is reduced.

The counter substrate 100b includes an insulative plate 12 (second plate) which is transmissive with respect to visible light. A color filter 14 and a light blocking layer 13 are provided on the insulative plate 12. The light blocking layer 13 is positioned in correspondence with the second opening 18. Width W2 of the light blocking layer 13 is set so that the light blocking layer 13 is extended beyond a bottom edge 18b of the second opening 18 by, for example, about 7 μm in the width direction and also beyond a bottom edge 18c of the second opening 18 by, for example, about 7 μm in the width direction.

A counter electrode 15 formed of a light-transmissive conductive layer is provided on the color filter 14 and the light blocking layer 13. An alignment layer 16 is provided on the counter electrode 15.

The liquid crystal layer 17 is provided between the active matrix substrate 100a and the counter substrate 100b having the above-described structure. The liquid crystal layer 17 is in contact with the alignment layers 16 respectively provided in the active matrix substrate 100a and the counter substrate 100b.

Surfaces 10a of the first opening 10 and surfaces 18a of the second opening 18 are both slanting. The slanting surfaces influence the orientation of liquid crystal molecules contained in the liquid crystal layer 17. As a result, domains of the liquid crystal molecules are generated in the liquid crystal layer, in areas corresponding to the vicinity of the first and second openings 10 and 18.

The storage capacitor line 19 shields the vicinity of the first opening 10 against light, thus preventing the light from transmitting through the domains. For this purpose, it is preferable that width W1 of the storage capacitor line 19 is set so that the storage capacitor line 19 is extended beyond each of the bottom edges 10b and 10c of the first opening 10 by, for example, about 5 μm in the width direction. The light blocking layer 13 shields the vicinity of the second opening 18 against light, thus preventing the light from transmitting through the domains. For this purpose, it is preferable that width W2 of the light blocking layer 13 is set so that the light blocking layer 13 is extended beyond each of the bottom edges 18b and 18c of the second opening 18 by, for example, about 7 μm in the width direction.

Hereinafter, an exemplary method for producing the liquid crystal display device 100 in the first example will be described with reference to FIGS. 1A, 1B and 2.

First, a method for producing the active matrix substrate 100a will be described.

The gate signal line 24, the gate electrode 24a and the storage capacitor line 19 are formed on the insulative plate 1 which is transmissive with respect to visible light. The gate insulating layer 3 is formed on the insulative plate 1 so as to cover the gate signal line 24, the gate electrode 24a and the storage capacitor line 19. Width W1 is set so that the storage capacitor line 19 is extended beyond each of the bottom edges 10b and 10c of the first opening 10 (to be formed later) by, for example, about 5 μm in the width direction. Then, the semiconductor layer 4 is formed on the gate insulating layer 3 so as to overlap the gate electrode 24a. An n⁺-Si layer is formed on the semiconductor layer 4 and patterned so as to be divided into two on the semiconductor layer 4. Thus, the source electrode 5 and the drain electrode 6 are formed. In the process of forming the source and drain electrodes 5 and 6, the channel region 4a is formed in the semiconductor layer 4.

The ITO layer, which is a light-transmissive conductive layer, is deposited thereon by sputtering and patterned, thereby forming the ITO layers 7a and 7b. Thus, a lower layer of the source signal line 26, a lower layer of the source leading electrode, and a lower layer of the drain leading electrode are formed. The patterning is performed so as to allow the ITO layer to overlap the storage capacitor line 19. The portion of the ITO layer which is extended from the lower layer of the drain leading electrode to an area above the storage capacitor line 19 acts as the leading electrode 7. Next, a metal layer is deposited thereon by sputtering and patterned, thereby forming the metal layers 8a and 8b. Thus, an upper layer of the source signal line 26, an upper layer of the source leading electrode, and an upper layer of the drain leading electrode are formed.

In this example, the source signal line 26 has a two-layer structure including the metal layer (upper) and the light-transmissive conductive ITO layer (lower). Even when the metal layer has a defect in a part thereof, the ITO layer maintains the electric connection. Such a structure is advantageous in reducing occurrence of electric disconnection of the source signal line 26.

A photosensitive resin such as, for example, an acrylic resin is applied on the gate insulating layer 3 so as to cover the source signal line 26, the TFT 23, and the leading electrode 7. The photosensitive resin is exposed to light through a photomask which has light-blocking areas in correspondence with a part of the storage capacitor line 19 and TFT 23. The photosensitive resin is developed with an alkaline solution, thereby removing the areas which have not been exposed to light. The resultant photosensitive resin is cured by heat, thereby forming the interlayer insulating layer 9 having the first opening 10 and the second opening 18. The first and second openings 10 and 18 are formed throughout the interlayer insulating layer 9. In this example, a negative-type photosensitive resin is used. Alternatively, a positive-type photosensitive resin is usable.

An ITO layer is formed on the interlayer insulating layer 9 by sputtering and patterned, thereby forming the pixel electrode 11. The ITO layer is patterned so that a peripheral area of the pixel electrode 11 overlaps a peripheral area of each of the gate signal line 24 and the source signal line 26. The pixel electrode 11 is electrically connected to the leading electrode 7 through the first opening 10, and thus is electrically connected to the drain electrode 6 of the TFT 23.

A polymer layer of, for example, polyimide is formed on the interlayer insulating layer 9 so as to cover the pixel electrode 11. The polymer layer is treated by rubbing, thereby forming the alignment layer 16.

Next, a method of producing the counter substrate 100b will be described.

A metal layer is formed on the insulative plate 12 which is transmissive with respect to visible light. The metal layer is patterned, thereby forming the light blocking layer 13. The patterning is performed so that the light blocking layer 13 overlaps the second opening 18 in the interlayer insulating layer 9 and also is extended beyond each of the bottom edges 18b and 18c of the second opening 18 by, for example, about 7 μm in the width direction.

Then, an area of the insulative plate 12 which is not covered by the light blocking layer 13 is coated with a photosensitive color resist. The color resist is exposed to light and developed, thereby forming color filters 14 for red, green and blue. The color filter 14 for one color corresponds to one pixel electrode 11.

Then, an ITO layer which is a light-transmissive conductive layer, is deposited on the light blocking layer 13 and the color filter 14 by sputtering, thereby forming the counter electrode 15. A polymer layer of, for example, polyimide is formed on the counter electrode 15. The polymer layer is treated by rubbing, thereby forming an alignment layer 16.

The active matrix substrate 100a and the counter substrate 100b are put together in the state where the pixel electrode 11 and the counter electrode 15 face each other. A liquid crystal material is injected into a gap between the active matrix substrate 100a and the counter substrate 100b, thereby forming the liquid crystal layer 17. In this manner, the liquid crystal display device 100 is produced.

In this example, the interlayer insulating layer 9 is formed by spin-coating the photosensitive acrylic resin and performing exposure, development and heat-curing. The exposure and development are conducted in order to form the first opening 10 and the second opening 18 in the interlayer insulating layer 9.

The second opening 18 formed above the TFT 23 eliminates the interlayer insulating layer 9 above the TFT 23, and thus eliminates the adverse influence exerted on the TFT 23 by the metal ions contained in the interlayer insulating layer 9. Accordingly, the deviation in the threshold voltage among a plurality of TFTs 23 is reduced.

The interlayer insulating layer 9 has slanting surfaces where the first and the second openings 10 and 18 are formed. The slanting surfaces cause generation of domains of liquid crystal molecules in the liquid crystal layer 17. The adverse influence exerted on the display quality by the slanting surfaces is prevented by forming the light blocking layers for shielding the vicinity of the first and second openings 10 and 18 against light in order to prevent the light to transmit through the domains in the liquid crystal layer 17. Regarding the first opening 10, the storage capacitor line 19 acts as the light blocking layer. For this purpose, it is preferable that width W1 of the storage capacitor line 19 is set so that the storage capacitor line 19 is extended beyond each of the bottom edges 10b and 10c of the first opening 10 by, for example, about 5 μm in the width direction. Regarding the second opening 18, the light blocking layer 13 is provided. For this purpose, it is preferable that width W2 of the light blocking layer 13 is set so that the light blocking layer 13 is extended beyond each of the bottom edges 18b and 18c of the second opening 18 by, for example, about 7 μm in the width direction.

In the case where the interlayer insulating layer 9 is treated by a standard etching method in order to eliminate an area thereof above the TFT 23, the TFT is damaged by the etchant. In this example, a photosensitive material is used for the interlayer insulating layer 9 and thus there is no need for etching. Therefore, the adverse influence of the etchant is avoided.

Figure 3:
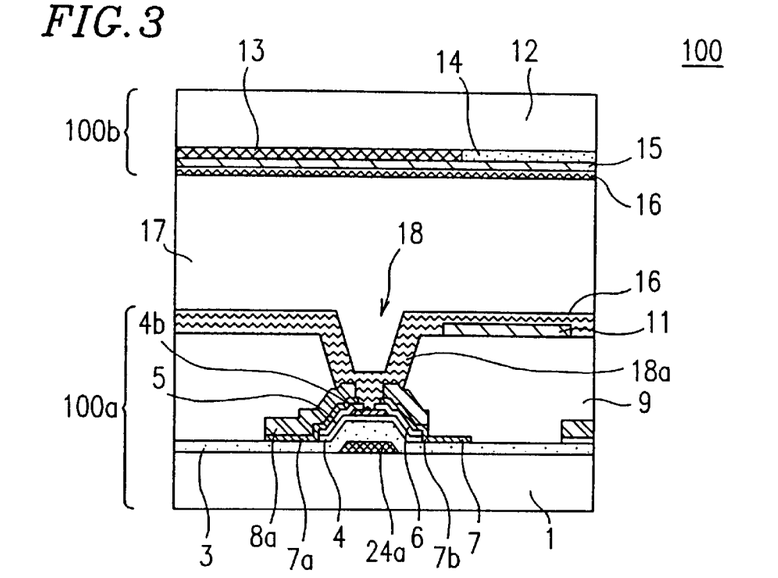
FIG. 3 is a cross-sectional view of a modification of the liquid crystal display device shown in FIG. 1A.

In this example, a channel etch type TFT is used as a switching element. The channel etch type TFT has no channel protection layer on the semiconductor layer. Alternatively, a channel protection type TFT as shown in FIG. 3 is also usable. The channel protection type TFT has a channel protection layer 4b on the semiconductor layer 4. As still another alternative, a silicon nitride layer or the like may be provided on the TFT for protecting the TFT.

In this example, a transmission type liquid crystal display device is described. The present invention is also applicable to a reflection type liquid crystal display device. A reflection type liquid crystal display device is produced by, for example, providing the pixel electrode 11 with a function of a reflective plate. One method for realizing this is to form the pixel electrode 11 of a light-reflective metal material in lieu of ITO. In this case, the first plate 1 does not need to be light-transmissive.

EXAMPLE 2

Figure 4:
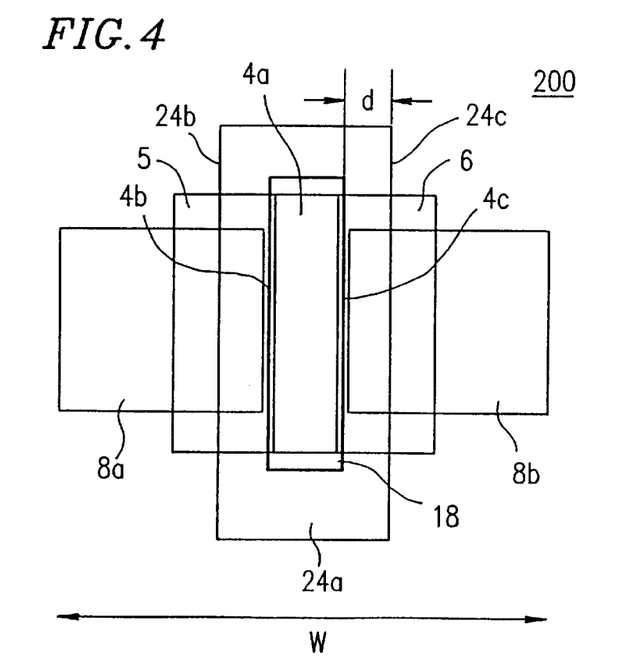
FIG. 4 is a view illustrating the planar positional relationship between a second opening and a TFT of a liquid crystal display device in a second example according to the present invention.

A liquid crystal display device 200 in a second example according to the present invention will be described. Unlike the liquid crystal display device 100, the liquid crystal display device 200 has the second opening 18 only above the channel region 4a of the TFT 23.

FIG. 4 shows the planar positional relationship between the second opening 18, the gate electrode 24a, the source electrode 5, the drain electrode 6, and the metal layers 8a and 8b. As shown in FIG. 4, the interlayer insulating layer (not shown in FIG. 4; corresponding to the interlayer insulating layer 9 shown in FIG. 2) has the second opening 18 above the channel region 4a of the TFT (not fully shown in FIG. 4; corresponding to the TFT 23 in FIG. 2).

The gate electrode 24a has a greater width (size in the direction of W) than the width of the second opening 18. In the plane shown in FIG. 4, distance d between an edge 24b of the gate electrode 24a and an edge 4b of the second opening 18, and between an edge 24c of the gate electrode 24a and an edge 4c of the second opening 18 is, for example, about 5 μm. Due to such a structure, the gate electrode 24a acts as a light blocking layer as described in the first example. Since the gate electrode 24a shields the second opening 18 against light, the counter substrate (not shown) does not need to have a light blocking layer for shielding the second opening 18.

The second opening 18 formed above the channel region 4a eliminates the interlayer insulating layer 9 above the channel region 4a, and thus eliminates the adverse influence exerted on the TFT by the metal ions contained in the interlayer insulating layer. Accordingly, the deviation in the threshold voltage among a plurality of TFTs is reduced.

The interlayer insulating layer has slanting surfaces where the openings are formed. The slanting surfaces cause generation of domains of liquid crystal molecules in the liquid crystal layer. The adverse influence exerted on the display quality by the slanting surfaces is prevented by forming the light blocking layers for shielding the vicinity of the openings against light. In the second example, the gate electrode 24a shields the vicinity of the second opening 18 against light in order to prevent the light from transmitting through the domains in the liquid crystal layer. For this purpose, it is preferable that the distance between each of two edges of the gate electrode 24a and the corresponding edge of the second opening 18 is, for example, about 5 μm. Such a structure reduces the area to be shielded against light in comparison with the first example.

EXAMPLE 3

Figure 5:
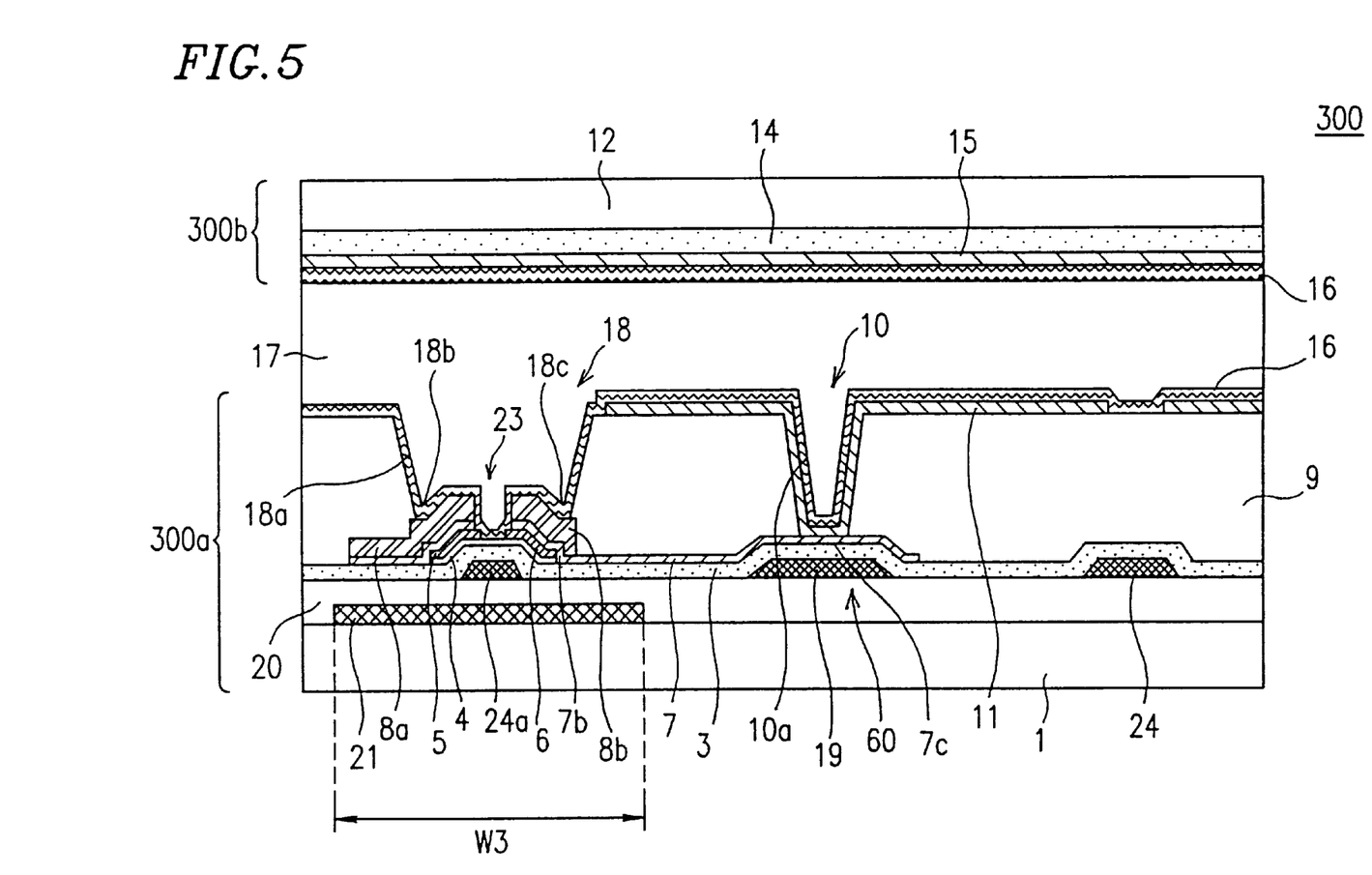
FIG. 5 is a cross-sectional view of a liquid crystal display device in a third example according to the present invention.

A liquid crystal display device 300 in a third example according to the present invention will be described. Unlike the liquid crystal display device 100, the liquid crystal display device 300 has a light blocking layer for shielding the vicinity of the second opening 18 against light in an active matrix substrate 300a.

FIG. 5 is a cross-sectional view of the liquid crystal display device 300. As shown in FIG. 5, the liquid crystal display device 300 includes the active matrix substrate 300a and a counter substrate 300b. The active matrix substrate 300a includes a plurality of light blocking elements 21 (only one corresponding to one pixel area is shown in FIG. 5) on the first plate 1. An insulating layer 20 is provided on the insulative plate 1 so as to cover the light blocking layers 21. The gate electrode 24a, the gate signal line 24, and the storage capacitor line 19 are provided on the insulating layer 20. The gate insulating layer 3 is provided on the insulating layer 20 so as to cover the gate electrode 24a, the gate signal line 24, and the storage capacitor line 19. Regarding the other points, the active matrix substrate 300a has the same structure as that of the active matrix substrate 100a in the first example.

The light blocking layer 21 covers the second opening 18 with the insulating layer 20 and the gate insulating layer 3 interposed therebetween. Width W3 of the light blocking layer 21 is set so that the light blocking layer 21 is extended beyond each of the bottom edges 18b and 18c of the second opening 18 by, for example, about 5 μm in the width direction. Since the light blocking layer 21 provided in the active matrix substrate 300a shields the second opening 18 against light, the counter substrate 300b does not need to have a light blocking layer for shielding the second opening 18 against light.

Hereinafter, an exemplary method for producing the active matrix substrate 300a will be described.

A metal layer is formed by sputtering on the insulative plate 1 (first plate) and patterned, thereby forming the light blocking layer 21. The patterning is performed so that the light blocking layer 21 is extended beyond each of the bottom edges 18b and 18c of the second opening 18 (to be formed later) by, for example, about 5 μm in the width direction. Then, the insulating layer 20 which is light-transmissive is formed of silicon oxide by CVD on the insulative plate 1 so as to cover the light blocking layer 21. The gate electrode 24a, the gate signal line 24, and the storage capacitor line 19 are formed of metal as described in the first example. The rest of the active matrix substrate 300a is produced in the same manner as described in the first example.

In the case where the light blocking layer for shielding the second opening 18 against light is provided in the counter substrate, it is necessary to determine the light blocking margin in consideration of the positional offset which is generated when the active matrix substrate and the counter substrate are assembled together. Such a necessity is eliminated by providing the light blocking layer 21 for shielding the second opening 18 against light in the active matrix substrate 300a. Accordingly, the area to be shielded against light in order to prevent the light from transmitting through the domains in the liquid crystal layer is reduced in comparison with the first example.

EXAMPLE 4

A liquid crystal display device 400 in a fourth example according to the present invention will be described.

Figure 9:
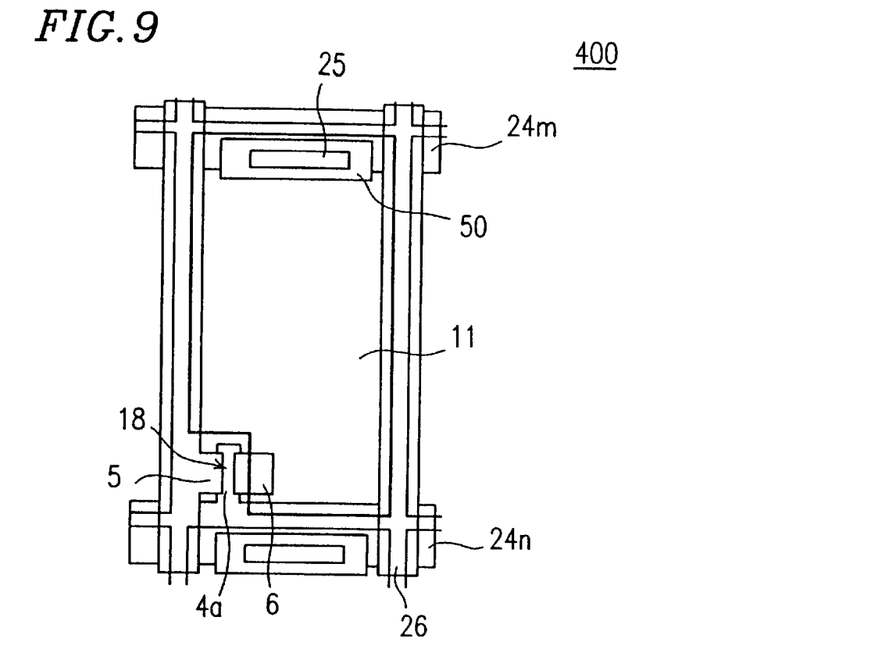
FIG. 9 is a plan view of one pixel area of a liquid crystal display device in a fourth example according to the present invention.

FIG. 9 is a plan view of one pixel area of the liquid crystal display device 400. As shown in FIG. 9, the interlayer insulating layer (not shown in FIG. 9; corresponding to the interlayer insulating layer 9 in FIG. 2) has the second opening 18 above the channel region 4a and the drain electrode 6 of the TFT (not fully shown in FIG. 9; corresponding to the TFT 23 in FIG. 2). The second opening 18 can be shielded against light by the light blocking layer 13 in the first example or the light blocking layer 21 in the third example. The pixel electrode 11 and the drain electrode 6 are electrically connected to each other through the second opening 18.

A storage capacitor (Cs) electrode 50 is provided on the gate insulating layer 3. The Cs electrode 50 and the source signal line 26 are in the same layer. The Cs electrode 50 overlaps a gate signal line 24m adjacent to the gate signal line 24n, which is connected to the TFT for the pixel electrode 11. The Cs electrode 50 is also electrically connected to the pixel electrode 11 through a first opening 25. The portion where the Cs electrode 50, the gate insulating layer (not shown in FIG. 9; corresponding to the gate insulating layer 3 shown in FIG. 2) and the gate signal line 24m overlap one another acts as a storage capacitor. Such a structure is referred to as the "Cs on Gate structure".

Accordingly, unlike the liquid crystal display devices 100 through 300 in first through third examples, the storage capacitor line 19 and the leading electrode 7 are not necessary. Such a structure reduces the deviation in the threshold voltage among a plurality of TFTs, and also improves the aperture ratio of the liquid crystal display device 400 because the storage capacitor line 19 is not provided on a central area of the pixel area.

EXAMPLE 5

A liquid crystal display device 600 in a fifth example according to the present invention will be described.

Figure 10:
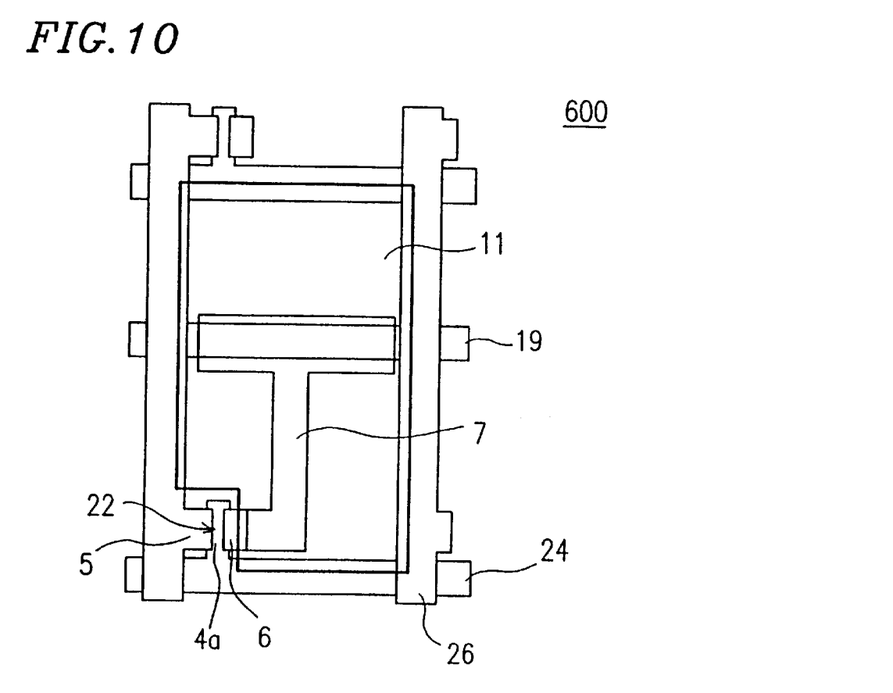
FIG. 10 is a plan view of one pixel area of a liquid crystal display device in a fifth example according to the present invention.

FIG. 10 is a plan view of one pixel area of the liquid crystal display device 600. As shown in FIG. 10, the interlayer insulating layer (not shown in FIG. 10; corresponding to the interlayer insulating layer 9 in FIG. 2) has an opening 22 above the channel region 4a and the drain electrode 6 of the TFT (not fully shown in FIG. 10; corresponding to the TFT 23 in FIG. 2). The opening 22 can be shielded against light by the light blocking layer 13 in the first example or the light blocking layer 21 in the third example. The pixel electrode 11 and the drain electrode 6 are electrically connected to each other through the opening 22. Such a structure reduces the deviation in the threshold voltage among a plurality of TFTs.

In this example, only one opening 22 is formed in the interlayer insulating layer. Other structural features in the previous examples can be adopted in this example.

According to the present invention, the interlayer insulating layer has an opening above the TFT. Such a structure eliminates the adverse influence exerted on the TFT by the metal ions contained in the interlayer insulating layer. Thus, the deviation in the threshold voltage among a plurality of TFTs is reduced.

According to the present invention, a light blocking member is provided for covering the opening. The slanting surfaces of the opening cause generation of domains of liquid crystal molecules in the liquid crystal layer, in an area corresponding to the vicinity of the opening. The adverse influence exerted on the display quality by the slanting surfaces is prevented by forming the light blocking member for preventing the light from transmitting through the domains.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:
   a first plate and a second plate;
   a liquid crystal layer interposed between the first plate and the second plate;
   a switching element provided between the first plate and the liquid crystal layer;
   an interlayer insulating layer provided between the first plate and the liquid crystal layer;

a pixel electrode provided on the interlayer insulating layer;

a counter electrode provided between the second plate and the liquid crystal layer; and a gate signal line and a source signal line both connected to the switching element, wherein:

the interlayer insulating layer has a first opening and a second opening, the pixel electrode is electrically connected to the switching element through the first opening, the second opening is positioned directly above a channel region of the switching element, and the interlayer insulating layer contains metal ions and the second opening reduces the influence exerted on the switching element by the metal ions contained in the interlayer insulating layer.

2. A liquid crystal display device according to claim 1, further comprising:

a first light blocking member covering the first opening for shielding the first opening against light; and a second light blocking member covering the second opening for shielding the second opening against light.

3. A liquid crystal display device according to claim 1, wherein the switching element is a thin film transistor.

4. A liquid crystal display device according to claim 3, wherein the thin film transistor comprises:

a gate electrode electrically connected to the gate signal line;

a source electrode electrically connected to the source signal line;

a drain electrode electrically connected to the pixel electrode; and a channel region for electrically connecting the source electrode and the drain electrode when the gate electrode is supplied with a voltage.

5. A liquid crystal display device according to claim 4, further comprising:

a first light blocking member covering the first opening for shielding the first opening against light; and a second light blocking member covering the second opening for shielding the second opening against light.

6. A liquid crystal display device according to claim 5, wherein the second light blocking member is the gate electrode.

7. A liquid crystal display device according to claim 5, wherein the second light blocking member is provided between the second plate and the liquid crystal layer.

8. A liquid crystal display device according to claim 5, wherein the second light blocking member is provided between the first plate and the thin film transistor, and the thin film transistor is provided above the second light blocking member with an insulating layer interposed therebetween.

9. A liquid crystal display device according to claim 1, wherein the interlayer insulating layer includes a photosensitive organic insulating layer.

10. A liquid crystal display device, comprising:

a first plate and a second plate;

a liquid crystal layer interposed between the first plate and the second plate;

a switching element provided between the first plate and the liquid crystal layer;

an interlayer insulating layer provided between the first plate and the liquid crystal layer;

a pixel electrode provided on the interlayer insulating layer;

a counter electrode provided between the second plate and the liquid crystal layer; and a gate signal line and a source signal line both connected to the switching element, wherein:

the interlayer insulating layer has an opening, the pixel electrode is electrically connected to the switching element through the opening, and the opening is positioned directly above a channel region of the switching element.

11. A liquid crystal display device according to claim 10, further comprising:

a light blocking member covering the opening for shielding the opening against light.

12. A liquid crystal display device according to claim 10, wherein the switching element is a thin film transistor.

13. A liquid crystal display device according to claim 12, wherein the thin film transistor comprises:

a gate electrode electrically connected to the gate signal line;

a source electrode electrically connected to the source signal line;

drain electrode electrically connected to the pixel electrode; and a channel region for electrically connecting the source electrode and the drain electrode when the gate electrode is supplied with a voltage, wherein the opening is positioned above the channel region and the drain electrode.

14. A liquid crystal display device according to claim 13, further comprising:

a light blocking member covering the opening for shielding the opening against light.

15. A liquid crystal display device according to claim 14, wherein the light blocking member is the gate electrode.

16. A liquid crystal display device according to claim 14, wherein the light blocking member is provided between the second plate and the liquid crystal layer.

17. A liquid crystal display device according to claim 14, wherein the light blocking member is provided between the first plate and the thin film transistor, and the thin film transistor is provided above the light blocking member with an insulating layer interposed therebetween.

18. A liquid crystal display device according to claim 10, wherein the interlayer insulating layer includes a photosensitive organic insulating layer.

19. A liquid crystal display device according to claim 10, wherein the gate signal line and the source signal line overlap a peripheral area of the pixel electrode.

20. A liquid crystal display device according to claim 19, wherein the interlayer insulating layer contains metal ions and the opening reduces the influence exerted on the switching element by the metal ions contained in the interlayer insulating layer.

21. A liquid crystal display device comprising:

an active matrix substrate and a counter substrate spaced apart from each other;

a liquid crystal layer disposed in the space between said active matrix substrate and said counter substrate;

said active matrix substrate comprising switching elements, gate signal lines for supplying control signals to said switching elements, source signal lines for supplying data signals to said switching elements, an interlayer insulating layer, and pixel electrodes connected to said switching elements and formed on said interlayer insulating layer;

said counter substrate comprising a counter electrode layer;

said switching elements comprising transistors including channel regions;

first openings formed directly above the channel regions of said switching elements and extending completely through said interlayer insulating layer;

second openings extending completely through said interlayer insulating layer, wherein said pixel electrodes are connected to said switching elements through said second openings; and storage capacitor lines arranged on said active matrix substrate such that portions of said storage capacitor lines constitute light blocking portions for blocking light in the vicinity of said second openings, wherein the gate signal lines and the source signal lines are overlapped beneath peripheral areas of the pixel electrodes with the interlayer insulating layer interposed therebetween.

22. A liquid crystal display device according to claim 21, further comprising:

a light blocking layer formed on said counter substrate and having light blocking portions arranged in correspondence with said first openings.

23. A liquid crystal display device according to claim 21, further comprising:

a light blocking layer formed on said active matrix substrate and having light blocking portions arranged in correspondence with said first openings.

24. A liquid crystal display device according to claim 21, wherein said transistors comprise thin film transistors.

25. A liquid crystal display device according to claim 21, wherein each of said transistors comprises:

a gate electrode electrically connected to one of said gate signal lines;

a source/drain electrode electrically connected to one of said source signal lines;

a drain/source electrode electrically connected to one of said pixel electrodes.

26. A liquid crystal display device according to claim 25, wherein said first openings are formed directly above said channel regions, said source/drain electrodes and said drain/source electrodes of said transistors.

27. A liquid crystal display device according to claim 26, wherein said interlayer insulating layer comprises a photosensitive layer.

28. A liquid crystal display device according to claim 21, wherein said pixel electrodes are formed of a light-reflecting material.

29. A liquid crystal display device according to claim 21, wherein said transistors include gate electrodes and a dimension of said gate electrodes in a channel-length direction is greater than a dimension of said first openings in the channel-length direction.

30. A liquid crystal display device comprising:

an active matrix substrate and a counter substrate spaced apart from each other;

a liquid crystal layer disposed in the space between said active matrix substrate and said counter substrate;

said active matrix substrate comprising switching elements, gate signal lines for supplying control signals to said switching elements, source signal lines for supplying data signals to said switching elements, an interlayer insulating layer, and pixel electrodes connected to said switching elements and formed on said interlayer insulating layer;

said counter substrate comprising a counter electrode layer;

said switching elements comprising transistors including channel regions; and first openings formed directly above the channel regions of said switching elements and extending completely through said interlayer insulating layer, wherein said pixel electrodes and said switching elements are connected through said first openings.

31. A liquid crystal display device according to claim 30, further comprising:

storage capacitor electrodes insulatively spaced from said gate signal lines, wherein said pixel electrodes are connected to said storage capacitor electrodes through second openings formed in said interlayer insulating layer.

* * * * *